United States Patent Office.

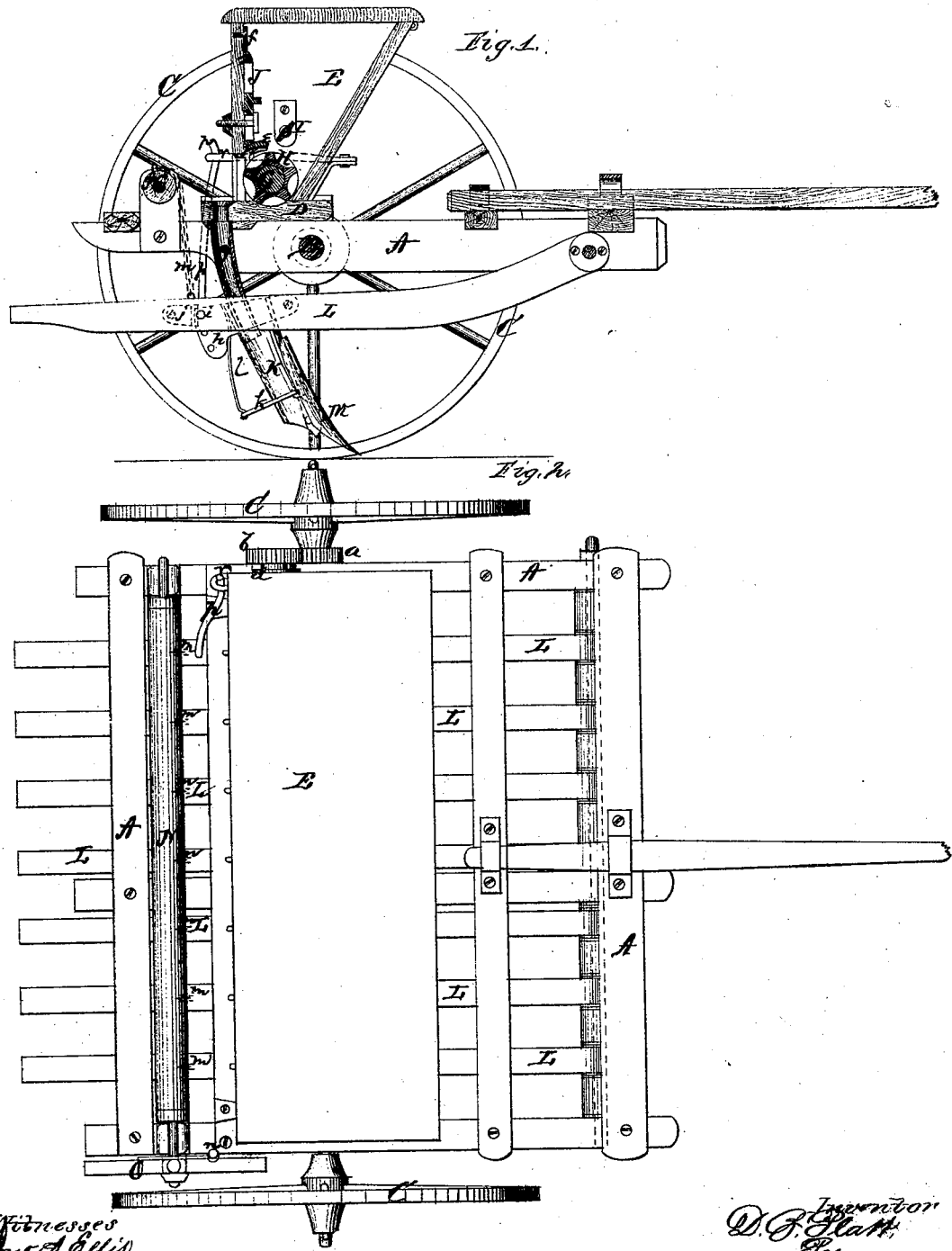

DAVID B. PLATT, OF JEFFERSONVILLE, INDIANA.

Letters Patent No. 111,675, dated February 7, 1871.

IMPROVEMENT IN COMBINED GRAIN-DRILLS AND CORN-CULTIVATORS.

The Schedule referred to in these Letters Patent and making part of the same.

*To all whom it may concern:*

Be it known that I, DAVID B. PLATT, of Jeffersonville, in the county of Clark and State of Indiana, have invented certain new and useful Improvements in Combined Grain-Drill and Corn-Cultivator; and I do hereby declare that the following is a full, clear, and exact description thereof, reference being had to the accompanying drawing and to the letters of reference marked thereon, which form a part of this specification.

The nature of my invention consists in the construction and arrangement of a "combined grain-drill and corn-cultivator," as will be hereinafter fully set forth.

In order to enable others skilled in the art to which my invention appertains to make and use the same, I will now proceed to describe its construction and operation, referring to the annexed drawing, in which—

Figure 1 is a vertical cross-section, and
Figure 2, a plan view of my machine.

A represents the frame of my machine, through which passes the axle B, having a wheel, C, at each end.

On the top of the frame A, so as to be directly above and in rear of the axle B, is placed a narrow platform, D, upon which rests the seed or grain-box E.

Longitudinally through this box passes the shaft G, upon which, at suitable intervals, are placed the wheels H. These wheels are, around their periphery, provided with cup-shaped recesses, as shown in fig. 1.

The shaft G, with its wheels, is revolved by means of a pinion, a, secured to or on the axle B, and gearing with a loose pinion or cog-wheel, b, on the shaft G.

A clutch, d, on said shaft is thrown in and out of gear with said pinion b by means that will be presently described, so as to cause the shaft G to revolve or not as may be desired.

On the opposite end of the shaft G is another cog-wheel or pinion, gearing with a similar one upon the journal of a bar, I, which passes through the box E, parallel with the shaft G, and revolving in opposite direction from that of the shaft, agitates the grain in the box so as to make it fall into the recesses on the wheels H.

On the inside of the back of the box E, opposite each wheel H, is placed a sliding plate, J, the lower end of which forms a saddle, e, above and in rear of the wheel, to prevent any more than the desired quantity of grain to pass out through the opening at the lower rear edge of the box, each wheel having an opening in the box for the grain in the cup-shaped recesses to fall out.

Each plate J is slotted, as shown in fig. 1, and held by bolt and nut. By moving said plate up or down by means of the cam *f*, pivoted above its upper end, the quantity of grain to be sowed with each revolution of the wheel is easily regulated.

The grain falling from the cup-shaped recesses in the wheel H and the opening in the box E, passes down through a hole in the rear edge of the platform D, and through conductor *q*, to the shoe K and into the ground.

The shoe K is firmly attached to a plate, *h*, the front end of which is pivoted to a beam, L, while the rear end of said plate is enlarged and provided with several holes, through one of which a wooden pin, *i*, is passed into or through the beam L, to hold the shoe at any angle desired, or, in other words, to regulate the depth at which the shovel-plow attached to the shoe is to work.

At the rear edge of the plate *h*, to the beam is secured a smaller flanged plate, *j*, which acts as a guide to the plate *h*.

Between ears at the lower end on the front side of the shoe K, is pivoted an ear on the under side of the plow M, thus pivoting the same to the shoe.

The plow extends up along the front of the shoe, as shown, and to another ear on its rear side above the pivot-point, is attached a bail, *k*, which passes around the shoe, and is drawn toward the rear by means of a spring, *l*, attached to the shoe at the upper rear edge. This spring holds the plow in proper position against the front of the shoe, and, at the same time, will allow the plow to yield if it should strike any obstruction. But if any serious obstruction is in the way, then the wooden pin *i* will break and throw the whole shoe backward, so that, under no circumstances, can any of these parts be broken.

The beams L L are all pivoted on one rod under the front end of the frame A, with suitable blocks and washers between them to keep them the proper distance apart. The rear ends of said beams are, by chains, *m m*, connected with a roller, N, placed in suitable bearings in rear of the box E.

On one end of this roller is a spoke-wheel, O, by means of which the roller is turned or revolved to wind up the chains *m m*, and thus raise the beams, with the shoes and plows, up from the ground.

A spring-catch, *n*, holds the wheel O in any position it may be set, so that the plows will be held up from the ground whenever desired.

On the left beam L is a bent rod, *p*, which passes upward and toward the end of the box E, where it passes through an eye or loop formed on a lever, *r*, which is pivoted at the front edge of the box.

When the beams are raised up, as just described, this lever is, by means of the rods $p$, drawn inward, which forces a spring, $s$, attached to the end of the box, also inward. This spring draws with it the clutch $d$ from the pinion $b$, and thus throws the grain-dropping apparatus out of gear. When the beams L are lowered the lever $r$ is drawn outward, which releases the spring and allows it to throw the clutch $d$ in gear again.

Having thus fully described my invention,

What I claim as new, and desire to secure by Letters Patent, is—

1. The sliding plates J, provided with the saddles $e$, and adjusted by means of the cams $f$, substantially as and for the purposes herein set forth.

2. The wheels H H, provided with cup-shaped recesses, and operating in combination with the saddles $e$ $e$ on the adjustable sliding plates J J, substantially as and for the purposes herein set forth.

3. The agitator I, constructed as shown and described, and operating in combination with the cup-wheels H H, substantially as and for the purposes herein set forth.

4. The combination of the shoe K, plate $h$, beam L, wooden pin $i$, and guide-plate $j$, all constructed and arranged substantially as and for the purposes herein set forth.

5. The combination of the shoe K, plow M, bail $k$, and spring $l$, constructed and arranged substantially as and for the purposes herein set forth.

6. The arrangement of the bent rod $p$, lever $r$, spring $s$, and clutch $d$, substantially as shown and described, and for the purposes herein set forth.

In testimony that I claim the foregoing as my own, I affix my signature in presence of two witnesses.

D. B. PLATT.

Witnesses:
 JNO. F. READ,
 J. E. HOWARD.